(12) United States Patent
Drbohlav, III et al.

(10) Patent No.: US 8,647,728 B2
(45) Date of Patent: Feb. 11, 2014

(54) OXYGEN SCAVENGING RESIN WITH SHORT INDUCTION PERIOD

(75) Inventors: Joseph Drbohlav, III, Inman, SC (US); Zhongzhe Yuan, Boiling Springs, SC (US)

(73) Assignee: iNVISTA North America S.A.R.L., Wilmington, DE (US)

( * ) Notice: Subject to any disclaimer, the term of this patent is extended or adjusted under 35 U.S.C. 154(b) by 133 days.

(21) Appl. No.: 13/202,466

(22) PCT Filed: Feb. 17, 2010

(86) PCT No.: PCT/US2010/024442
§ 371 (c)(1),
(2), (4) Date: Jan. 13, 2012

(87) PCT Pub. No.: WO2010/096459
PCT Pub. Date: Aug. 26, 2010

(65) Prior Publication Data
US 2012/0114887 A1 May 10, 2012

Related U.S. Application Data

(60) Provisional application No. 61/154,162, filed on Feb. 20, 2009.

(51) Int. Cl.
*B29C 65/00* (2006.01)
*B29D 22/00* (2006.01)
*B29D 23/00* (2006.01)
*B32B 1/08* (2006.01)

(52) U.S. Cl.
USPC ......... 428/35.5; 428/36.9; 428/480; 524/378; 524/419

(58) Field of Classification Search
USPC ................ 428/35.5, 36.9, 480; 524/378, 419
See application file for complete search history.

(56) References Cited

U.S. PATENT DOCUMENTS

| 3,907,926 A | 9/1975 | Brown et al. |
| 6,346,308 B1 | 2/2002 | Cahill et al. |
| 6,455,620 B1 | 9/2002 | Cyr et al. |
| 6,875,400 B2 | 4/2005 | Speer et al. |
| 2006/0122306 A1 | 6/2006 | Stafford et al. |
| 2008/0171169 A1 | 7/2008 | Liu |

FOREIGN PATENT DOCUMENTS

| EP | 0 437 942 A2 | 7/1991 |
| JP | 1098624 | 4/1989 |
| JP | 2006-321908 | 11/2006 |
| JP | 2006-321909 | 11/2006 |
| WO | WO 01/10947 | 2/2001 |
| WO | WO 2009/032560 A1 | 3/2009 |

OTHER PUBLICATIONS

Qureshi et al., "Oxygen-Barrier Properties of Oriented and Heat-Set Poly(ethylene terephthalate)," *Journal of Polymer Science: Part B: Polymer Physics*, 2000, pp. 1679-1686, vol. 38.

Sekelik et al., "Oxygen Barrier Properties of Crystallized and Talc-Filled Poly(ethylene terephthalate)," *Journal of Polymer Science: Part B: Polymer Physics*, 1999, vol. 37, pp. 847-867.

*Primary Examiner* — Michael C Miggins
(74) *Attorney, Agent, or Firm* — Womble Carlyle Sandridge & Rice, LLP

(57) ABSTRACT

The present invention relates to a composition comprising a polyester, a copolyester ether, and an oxidation catalyst, wherein the copolyester ether comprises a zinc compound and at least one polyether segment selected from the group consisting of poly(tetramethylene ether) and poly(tetramethylene-co-alkylene ether). The present invention further relates to articles made from the composition and methods to make the composition and the articles.

42 Claims, No Drawings

OXYGEN SCAVENGING RESIN WITH SHORT INDUCTION PERIOD

CROSS-REFERENCE TO RELATED APPLICATION

This application claims benefit of priority from U.S. Provisional Application No. 61/154,162 filed Jan. 20, 2009.

FIELD OF THE INVENTION

This invention relates to copolyester-ether compositions and organic polymeric compositions that provide an active oxygen gas barrier with short oxygen scavenging induction periods.

BACKGROUND OF THE INVENTION

Plastic materials, such as polyesters, have been replacing glass and metal packaging materials due to their lighter weight, decreased breakage compared to glass, and potentially lower cost. One problem in this use of polyester for these applications is its relatively high gas permeability. This restricts the shelf life of carbonated soft drinks and oxygen sensitive materials such as beer and fruit juices. Organic oxygen scavenging materials for use in mixtures with plastic materials, such as polyesters, have been developed partly in response to the food industry's goal of having longer shelf-life for packaged materials.

One method of using oxygen scavenging materials which is currently being employed involves the use of "active packaging" where the package is modified in some way so as to control the exposure of the product to oxygen. One technique involves incorporating an oxygen scavenger into the package structure itself. In such a package structure, oxygen scavenging materials constitute at least a portion of the package. These materials remove oxygen from the enclosed package volume which surrounds the product or which may leak into the package, thereby inhibiting spoilage and prolonging freshness in the case of food products. Oxygen scavenging materials used in this package structure include low molecular-weight oligomers that are typically incorporated into polymers or oxidizable organic polymers in which either the backbone or side-chains of the polymer react with oxygen. A common oxidizable polymer used in a package structure is a polyamide, such as MXD-6 nylon. Such oxygen scavenging materials are typically employed with a suitable catalyst, for example an organic or inorganic salt of a transition metal catalyst such as cobalt.

U.S. Pat. No. 6,455,620 discloses polyethers, such as poly(alkylene oxide) glycols—for example polytetramethylene oxide glycol, as oxygen scavenging moieties blended with thermoplastic polymers and a transition metal catalyst. Typically copolyester-ethers are catalyzed by titanium alkoxide catalysts. The time required for the oxygen scavenging resin to begin scavenging oxygen once the package is formed is referred to as the "oxygen scavenging induction period". The compositions taught in U.S. Pat. No. 6,455,620, when blended with polyesters, have a long oxygen scavenging induction period before scavenging oxygen in stretch blow molded containers.

SUMMARY OF THE INVENTION

It is desirable for an oxygen scavenging resin to have a short "oxygen scavenging induction period" so as to begin scavenging oxygen immediately after the packaging article is filled with food or beverage. This is desirable so that the food or beverage, itself, does not react with oxygen in the headspace of the package or oxygen permeating the walls of the package. It is desirable for the oxygen scavenging induction period to be short so that the contents of the package are not exposed to oxygen for any significant period of time. It is also desirable that the final packaging article retain a high degree of clarity or low degree of "haze" when the oxygen scavenging resin is added to the thermoplastic material comprising the major portion of the package.

Therefore, a need exists for copolyester-ethers that can be used in a compatible blend with polyester in monolayer packaging articles such that the articles made from the blend have a short oxygen scavenging induction period.

In accordance with the present invention, it has now been found that certain copolyester-ethers can be used in a compatible blend with polyester in monolayer packaging articles such that the articles made from the blend have a short oxygen scavenging induction period. The present invention relates to a composition comprising a polyester, a copolyester ether, and an oxidation catalyst, wherein the copolyester ether comprises a zinc compound and at least one polyether segment selected from the group consisting of poly(tetramethylene ether) and poly(tetramethylene-co-alkylene ether). The present invention further relates to articles made from the composition and methods to make the composition and the articles.

DETAILED DESCRIPTION OF THE INVENTION

The present invention can be characterized as a composition comprising a polyester, a copolyester ether, and an oxidation catalyst, wherein the copolyester ether comprises a zinc compound and at least one polyether segment selected from the group consisting of poly(tetramethylene ether) and poly(tetramethylene-co-alkylene ether). The copolyester ether can further comprise a polyether segment of a poly(alkylene oxide) glycol selected from the group consisting of poly(ethylene oxide) glycol, poly(trimethylene oxide) glycol, poly(tetramethylene oxide) glycol, poly(pentamethylene oxide) glycol, poly(hexamethylene oxide) glycol, poly(heptamethylene oxide) glycol, poly(octamethylene oxide) glycol and poly(alkylene oxide) glycols derived from cyclic ether monomers.

The alkylene of the poly(tetramethylene-co-alkylene ether) can be $C_2$ to $C_4$, for example ethylene, propylene or butylene, suitably where the alkylene is ethylene or poly(tetramethylene-co-ethylene ether). The molecular weight of the polyether segment can be in the range of from about 200 g/mole to about 5000 g/mole, for example from about 1000 g/mole to about 3000 g/mole. The mole % of alkylene oxide in the polyether segment can be in the range of from about 10 mole % to about 90 mole %, for example from about 25 mole % to about 75 mole % or from about 40 mole % to about 60 mole %. For use in the preparation of the copolyester ether, the end group of the polyether segment is hydroxyl, for example a poly(tetramethylene oxide) glycol or a poly(tetramethylene-co-alkylene oxide) glycol which for example can be poly(tetramethylene-co-ethylene oxide) glycol or poly(tetramethylene-co-propylene oxide) glycol.

The total amount of copolyester ether in the final composition is chosen to provide the desired oxygen scavenging performance of the article formed from the composition. Amounts of the copolyester ether can be at least about 0.5 weight % of the total composition, or in the range of from about 0.5 weight % to about 10 weight % of the total composition, for example from about 1.0 weight % to about 5.0 weight % or from about 1.5 weight % to about 3.0 weight % of the total composition. The copolyester ether can be physically blended with the polyester. Alternatively, the poly(alkylene oxide) glycol can be copolymerized with the polyester.

The copolyester ethers can contain the polyether segment in the range of from about 15 weight % to 95 weight % of the copolyester ether, for example from about 25 weight % to about 75 weight % or from about 30 weight % to about 70 weight % of the copolyester ether, using ethane glycol, butane diol or propane diol as the other glycol. Antioxidants can be added during polymerization to control the degradation of the ester-ether segments.

The copolyester ethers can be produced by ester interchange with the dialkyl ester of a dicarboxylic acid. In the ester interchange process dialkyl esters of dicarboxylic acids undergo transesterification with one or more glycols in the presence of a zinc compound as a catalyst. Compounds such as an oxide, hydroxide, alkoxide, aliphatic acid salt, oxalate, citrate, carbonate, halide or complex compound of zinc can be used, for example zinc acetate. A suitable amount of elemental zinc in the copolyester-ether can be about 35 to about 100 ppm, for example about 40-80 ppm, by weight of the copolyester-ether. The poly(alkylene oxide) glycols replace part of these glycols in these esterification processes. The poly(alkylene oxide) glycols can be added with the starting raw materials or added after esterification. In either case, the monomer and oligomer mixture can be produced continuously in a series of one or more reactors operating at elevated temperature and pressures at one atmosphere or greater. Alternatively, the monomer and oligomer mixture can be produced in one or more batch reactors. In batch processes, a monomer heel, comprising the monomer bishydroxyethylterephthalate (BHET) can be left in the transesterification reactor to aid the esterification of the next batch. Suitable conditions for these reactions are temperatures of from about 180° C. to 250° C. and pressures of from about 1 bar to 4 bar.

Next, the mixture of copolyester ether monomer and oligomers undergoes melt-phase polycondensation to produce a low molecular weight precursor polymer. The precursor is produced in a series of one or more reactors operating at elevated temperatures. To facilitate removal of excess glycols, water, and other reaction products, the polycondensation reactors are run under a vacuum. Catalysts for the polycondensation reaction include compounds of antimony, germanium, tin, titanium and aluminum, with titanium compound preferred. A suitable amount of elemental Ti can be about 20 to about 60 ppm, for example about 25 to 35 ppm. Reaction conditions for polycondensation can include (i) a temperature less than about 290° C., or about 10° C. higher than the melting point of the copolyester ether; and (ii) a pressure of less than about 0.01 bar, decreasing as polymerization proceeds. This copolyester ether can be produced continuously in a series of one or more reactors operating at elevated temperature and pressures less than one atmosphere. Alternatively this copolyester ether can be produced in one or more batch reactors. The intrinsic viscosity after melt phase polymerization can be in the range of about 0.5 dl/g to about 1.5 dl/g.

After extruding the molten copolyester ether through a die, the strands are quenched in a bath of cold water and cut into pellets. These pellets can be fed directly into an extruder for forming the article, or solid stated at conventional conditions until the desired molecular weight is attained.

Polyesters to be used in this invention can be produced from the reaction of a diacid or diester component comprising at least 65 mole % terephthalic acid or $C_1$-$C_4$ dialkylterephthalate, for example from at least 65 mole % to at least 95 mole % or at least 95 mole %; and a diol component comprising at least 65% mole % ethylene glycol, for example from at least 65 mole % to at least 95 mole % or at least 95 mole %. The diacid component can be terephthalic acid and the diol component can be ethylene glycol, thereby forming polyethylene terephthalate (PET). The mole percent for all the diacid component totals 100 mole %, and the mole percentage for all the diol component totals 100 mole %.

Where the polyester components are modified by one or more diol components other than ethylene glycol, suitable diol components of the described polyester can be selected from 1,4-cyclohexandedimethanol, 1,2-propanediol, 1,4-butanediol, 2,2-dimethyl-1,3-propanediol, 2-methyl-1,3-propanediol (2 MPDO), 1,6-hexanediol, 1,2-cyclohexanediol, 1,4-cyclohexanediol, 1,2-cyclohexanedimethanol, 1,3-cyclohexanedimethanol, 2,2,4,4-tetramethyl-1,3-cyclobutane diol or diols containing one or more oxygen atoms in the chain, for example, diethylene glycol, triethylene glycol, dipropylene glycol, tripropylene glycol or a mixtures thereof. The diols can contain 2 to 18 carbon atoms, for example 2 to 8 carbon atoms. Cycloaliphatic diols can be employed in their cis or trans configuration, or as a mixture of both forms. Modifying diol components can be 1,4-cyclohexanedimethanol or diethylene glycol, or a mixture of these.

Where the polyester components are modified by one or more acid components other than terephthalic acid, the suitable acid components (aliphatic, alicyclic, or aromatic dicarboxylic acids) of the linear polyester can be selected from isophthalic acid, 5-sulfoisophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, 2,6-naphthalenedicarboxylic acid, bibenzoic acid, or mixtures of these and the like. In the polymer preparation, a functional acid derivative thereof can be used such as the dimethyl, diethyl, or dipropyl ester of the dicarboxylic acid. The anhydrides or acid halides of these acids also can be employed where practical. These dicarboxylic acid modifiers generally retard the crystallization rate compared to terephthalic acid. A polyester that can be used in the present invention is the copolymer of PET and isophthalic acid or 5-sulfoisophthalic acid or a mixture of these. Generally the total isophthalic acid and 5-sulfoisophthalic acid can be present from about 1 mole % to about 10 mole %, or from about 1.5 mole % to 6 mole % of the copolymer.

In addition to polyester made from terephthalic acid (or dimethyl terephthalate) and ethylene glycol, or a modified polyester as stated above, the present invention can also include use of 100% of an aromatic diacid such as 2,6-naphthalene dicarboxylic acid or bibenzoic acid, or their diesters, and a modified polyester made by reacting at least 85 mol-% of the dicarboxylate from these aromatic diacids/diesters with any of the above comonomers.

The polyester of the present invention can be at least one member selected from polyethylene terephthalate, polyethylene naphthalate, polyethylene isophthalate, copolymers of polyethylene terephthalate, copolymers of polyethylene naphthalate, copolymers of polyethylene isophthalate or mixtures thereof; for example the polyester can be a copolymer of polyethylene terephthalate, such as poly(ethylene terephthalate-co-ethylene isophthalate) or poly(ethylene terephthalate-co-ethylene 5-sulfoisophthalate).

Suitable oxidation catalysts include transition metal catalysts that activate or promote the oxidation of the copolyester ether. The transition metal can be in the form of a transition metal salt with the metal selected from the first, second or third transition series of the Periodic Table. Suitable transition metals include cobalt, copper, rhodium, ruthenium, palladium, tungsten, osmium, cadmium, silver, tantalum, hafnium, vanadium, titanium, chromium, nickel, zinc, manganese or mixtures thereof. Suitable counter ions for the metal include, but are not limited to, carboxylates, such as neodecanoates, octanoates, stearates, acetates, naphthalates, lactates, maleates, acetylacetonates, linoleates, oleates, palminates or 2-ethyl hexanoates, oxides, borides, carbonates, chlorides, dioxides, hydroxides, nitrates, phosphates, sulfates, silicates or mixtures thereof. For example, cobalt stearate and cobalt acetate are oxidation catalysts that can be used in the present invention. Any amount of catalyst which is effective in catalyzing oxygen scavenging can be used, for example at least about 10 ppm of the total composition or in the range of from about 25 ppm and about 500 ppm of the total composition, for example from about 50 ppm to about 250 ppm or from about 50 ppm to about 100 ppm of the total composition. The oxidation catalyst can be added during polymerization or compounded as a polyester based master batch that can be added during the preparing of the article formed by blending polyester with the copolyester ether.

The zinc compound can be selected from the group consisting of zinc oxide, zinc hydroxide, zinc alkoxide, aliphatic acid salt of zinc, zinc acetate, zinc oxalate, zinc citrate, zinc carbonate, zinc halide and a complex compound of zinc; for example the zinc compound can be zinc acetate. The zinc compound can be present in an amount of from about 40 ppm to about 100 ppm of the total composition, for example from about 50 ppm to about 80 ppm of the total composition.

The composition of the present invention can further comprise an additive. The additive can be selected from heat stabilizers, anti-blocking agents, antioxidants, antistatic agents, UV absorbers, toners (for example pigments and dyes), fillers, branching agents, or other typical agents. For example the additive can be at least one member selected from the group consisting of a heat stabilizer, an anti-blocking agent, an antioxidant, an antistatic agent, a UV absorber, a pigment, a dye, a filler, a branching agent and mixtures thereof. The additive can be added to the composition generally during or near the end of the polycondensation reaction. Conventional systems can be employed for the introduction of additives to achieve the desired result.

Another embodiment of the present invention is an article comprising the composition described above. Suitable articles include, but are not limited to, film, sheet, tubing, pipes, fiber, container preforms, blow molded articles such as rigid containers, thermoformed articles, flexible bags and the like and combinations thereof. The article can comprise one or more layers of the composition described above. Typical rigid or semi-rigid articles can be formed from plastic, paper or cardboard cartons or bottles such as juice, milk, soft drink, beer and soup containers, thermoformed trays or cups. In addition, the walls of such articles often comprise multiple layers of materials. This invention can be used in one, some, or all of those layers.

Another embodiment of the present invention is a method of producing an oxygen scavenging resin comprising: a) esterifying or transesterifying a polyester precursor with an alkylene glycol and a poly(alkylene oxide) glycol in the presence of a zinc compound to form a copolyester ether, wherein the copolyester ether comprises at least one polyether segment selected from the group consisting of poly(tetramethylene ether) and poly(tetramethylene-co-alkylene ether), b) blending the copolyester ether with a polyester and an oxidation catalyst, c) melting the blend to form a homogeneous blend, and d) cooling and cutting the molten blend into solid pellets. The polyester precursor can be selected from the group consisting of pure terephthalic acid and dimethyl terephthalate. The alkylene glycol can be selected from the group consisting of ethylene glycol, propylene glycol and butylene glycol; for example ethylene glycol. The zinc compound can be selected from the group consisting of zinc oxide, zinc hydroxide, zinc alkoxide, aliphatic acid salt of zinc, zinc acetate, zinc oxalate, zinc citrate, zinc carbonate, zinc halide and a complex compound of zinc; for example zinc acetate. The oxidation catalyst can be a transition metal salt comprising i) a metal comprising at least one member selected from the group consisting of cobalt, copper, rhodium, ruthenium, palladium, tungsten, osmium, cadmium, silver, tantalum, hafnium, vanadium, titanium, chromium, nickel, zinc, manganese and mixtures thereof, and ii) a counter ion comprising at least one member selected from the group consisting of carboxylate, oxide, boride, carbonate, chloride, dioxide, hydroxide, nitrate, phosphate, sulfate, silicate and mixtures thereof. The carboxylate can be selected from the group consisting of neodecanoate, octanoate, stearate, acetate, naphthalate, lactate, maleate, acetylacetonate, linoleate, oleate, palminate, and 2-ethyl hexanoate. For example the oxidation catalyst can be at least one member selected from the group consisting of cobalt stearate and cobalt acetate.

Another embodiment of the present invention is a method for reducing the gas permeability of polyester articles comprising: a) esterifying or transesterifying a polyester precursor with an alkylene glycol and a poly(alkylene oxide) glycol in the presence of a zinc compound to form a copolyester ether, wherein the copolyester ether comprises at least one polyether segment selected from the group consisting of poly(tetramethylene ether) and poly(tetramethylene-co-alkylene ether), b) blending the copolyester ether with a polyester and an oxidation catalyst to form a mixture, c) melting the mixture, and d) forming an article comprising the mixture. The polyester precursor can be selected from the group consisting of pure terephthalic acid and dimethyl terephthalate. The alkylene glycol can be selected from the group consisting of ethylene glycol, propylene glycol and butylene glycol; for example ethylene glycol. The zinc compound can be selected from the group consisting of zinc oxide, zinc hydroxide, zinc alkoxide, aliphatic acid salt of zinc, zinc acetate, zinc oxalate, zinc citrate, zinc carbonate, zinc halide and a complex compound of zinc; for example zinc acetate. The oxidation catalyst can be a transition metal salt comprising i) a metal comprising at least one member selected from the group consisting of cobalt, copper, rhodium, ruthenium, palladium, tungsten, osmium, cadmium, silver, tantalum, hafnium, vanadium, titanium, chromium, nickel, zinc, manganese and mixtures thereof, and ii) a counter ion comprising at least one member selected from the group consisting of carboxylate, oxide, boride, carbonate, chloride, dioxide, hydroxide, nitrate, phosphate, sulfate, silicate and mixtures thereof. The carboxylate can be selected from the group consisting of neodecanoate, octanoate, stearate, acetate, naphthalate, lactate, maleate, acetylacetonate, linoleate, oleate, palminate, and 2-ethyl hexanoate. For example the oxidation catalyst can be at least one member selected from the group consisting of cobalt stearate and cobalt acetate.

Test Procedures

1. Intrinsic Viscosity The intrinsic viscosity of the copolyester-ether was measured according the ASTM D 4603, using m-cresol as the solvent.

2. Oxygen Permeation of Bottles

Oxygen flux of bottle samples at ambient relative humidity, at one atmosphere pressure, and at 23° C. was measured with a Mocon Ox-Tran model 2/60 (MOCON Minneapolis, Minn.). A mixture of 98% nitrogen with 2% hydrogen was used as the carrier gas, and ambient air (20.9% oxygen) was used as the test gas. Prior to testing, specimens were conditioned in nitrogen inside the unit for a minimum of twenty-four hours to remove traces of atmospheric oxygen. The conditioning was continued until a steady base line was obtained where the oxygen flux changed by less than one percent for a 45-minute cycle. The test ended when the flux reached a steady state where the oxygen flux changed by less than 1% during a 45 minute test cycle. Oxygen Permeation results are measured and recorded as $cm^3$/package/day. To measure the Barrier Improvement Factor or "BIF"; a control bottle containing no oxygen scavenger is measured at the same time as the test bottles under identical conditions. The BIF is calculated by dividing the oxygen permeation of the control bottle, by the oxygen permeation of the test bottle. In order to facilitate determination of an induction period prior to onset of oxygen scavenging, a BIF value of 10.0× is used. This implies that the test bottle has a rate of permeation to oxygen of no more than 10% of the control bottle.

3. Bottle Wall Haze

The haze of the bottle walls was measured with a Hunter Lab Color Quest II instrument. D65 illuminant was used with a CIE 1964 10° standard observer. The haze is defined as the percent of the CIE Y diffuse transmittance to the CIE Y total transmission. Unless otherwise stated the % haze is measured on the sidewall of a stretch blow molded bottle having a thickness of 0.25 mm.

4. Elemental Content

The elemental content of the ground polymer samples was measured with an Atom Scan 16 ICP Emission Spectrograph. The sample was dissolved by heating in ethanolamine, and on cooling, distilled water was added to crystallize out the terephthalic acid. The solution was centrifuged, and the supernatant liquid analyzed. Comparison of atomic emissions from the samples under analysis with those of solutions of known elemental ion concentrations was used to determine the experimental values of elements retained in the polymer samples. This method is used to determine the cobalt and zinc concentration in the composition.

EXAMPLES

Example 1

Comparative

DMT, a molar excess of glycol and tetra-n-butyl titanate (Tyzor®, DuPont, USA) as the ester interchange catalyst (50 ppm of Ti) were charged into a reactor equipped with a condenser, reflux column and stirrer. The materials, which were stirred continuously during the trans-esterification, were heated to a temperature of 160-230° C. under atmospheric pressure until the ester interchange reaction was complete, as evidenced by the amount of methanol removed. The mixture was transferred to an autoclave, poly(tetramethylene oxide) glycol, having a number average molecular weight of 1400 g/mole, was added, equivalent to 50 weight % of the final polymer weight, together with Vertec® AC420 (Johnson Mathey, USA) (30 ppm Ti) as a polycondensation catalyst. The autoclave pressure was reduced to <0.3 mm Hg, and then the temperature was increased to 250° C. The mixture, which was stirred continuously during the polymerization, was held at this temperature until the required melt viscosity, as measured by the stirrer amperage, was met. The reactor was pressurized slightly with nitrogen and the product extruded into chilled water. After the polymer strand cooled, it was pelletized with Scheer-bay pelletizer. The intrinsic viscosity of the copolyester-ether was about 1.2 dl/g. The resin (2 weight %) was dried, blended with the dried base polyester 2300K resin (Invista Polyester & Resins, USA; this resin is based on a standard antimony catalyzed direct esterification of terephthalic acid, and ethylene glycol containing 0.2 weight % of 5-sulfoisophalic acid as the sodium salt, with late addition of cobalt stearate (75 ppm cobalt)) and injection molded into preforms. The preforms were stretch blow molded into 500 ml, 24 g bottles. The oxygen permeation and haze of these bottles were measured. The BIF results are set forth in Table 1, and the % haze in Table 2.

Example 2

Comparative

A PET/zinc acetate master batch was prepared by compounding a standard polyester resin (Invista type 2201) and zinc acetate dihydrate (1.5 weight %) to give a zinc elemental level of 4545 ppm.

The copolyester-ether from example 1 was blended with this masterbatch of zinc acetate to give a zinc content of 75 ppm. This dried blend (2 weight %) was blended with the 2300K polyester resin, and extruded into preforms. The preforms were stretch blow molded into 500 ml, 24 g bottles. The oxygen permeation and haze of these bottles were measured. The BIF results are set forth in Table 1, and the % haze in Table 2.

Example 3

The process of Example 1 was used to prepare a copolyester-ether with the difference being that zinc acetate (70 ppm Zn) was used as the ester interchange catalyst in place of the Tyzor Ti catalyst. The oxygen permeation and haze of these bottles were measured. The BIF results are set forth in Table 1, and the % haze in Table 2.

Example 4

Comparative

Example 1 was repeated substituting the PTMEG with 56 weight % of a poly(tetramethylene-co-ethylene oxide) glycol with a molecular weight of 2000 g/mole containing 50 mole % ethylene oxide segments). In addition 500 ppm of an antioxidant (Ethanox® 330, Albemarle Corp., USA) was added after the ester interchange reaction. The oxygen permeation of the bottles was measured and the BIF results are set forth in Table 1.

Example 5

Example 3 was repeated substituting the PTMEG with 56 weight % of a poly(tetramethylene-co-ethylene oxide) glycol with a molecular weight of 2000 g/mole containing 50 mole % ethylene oxide segments). In addition 500 ppm of an antioxidant (Ethanox® 330) was added after the ester interchange reaction. The oxygen permeation of the bottles was measured and the BIF results are set forth in Table 1.

Example 6

Example 5 was repeated, without the addition of the antioxidant. The oxygen permeation of the bottles was measured and the BIF results are set forth in Table 1.

Example 7

Example 3 was repeated with 40 ppm Zn as the ester interchange catalyst and 55 ppm Ti as the polycondensation catalyst. In addition 100 ppm of an antioxidant (Ethanox® 330) was added after the ester interchange reaction. The oxygen permeation of the bottles was measured and the BIF results are set forth in Table 1.

Example 8

Example 7 was repeated with 45 ppm Zn as the ester interchange catalyst and 30 ppm Ti as the polycondensation catalyst. The oxygen permeation of the bottles was measured and the BIF results are set forth in Table 1.

TABLE 1

| | BIF Values | | | | | | | |
|---|---|---|---|---|---|---|---|---|
| | Example | | | | | | | |
| Day | 1 (Comp.) | 2 (Comp.) | 3 | 4 (Comp.) | 5 | 6 | 7 | 8 |
| 3 | | | 1.6 | | | | 1.2 | 10 |
| 4 | 1.0 | 1.0 | 3.8 | | | 145 | 2 | 30 |
| 5 | | | 10.0 | | | 154 | 4 | |
| 6 | | 1.0 | 16.2 | | | 163 | 10 | |
| 7 | | 1.0 | | | 14.0 | | | |
| 8 | 1.6 | 1.0 | | 1.2 | 19.0 | 185 | | |
| 9 | | | | | 19.0 | | | |
| 12 | 6.4 | | | 3.5 | | | | |
| 14 | 9.0 | | | | | | | |
| 16 | | | | | 10.0 | | | |
| 20 | | | | | 11.0 | | | |
| 24 | | | | | 47.0 | | | |

The Inventive Examples (3, 5-8) using a zinc compound as the ester interchange catalyst have much shorter oxygen scavenging induction period than the Comparative Examples (1, 2 and 4) using a titanium ester interchange catalyst. In addition there is acceptable bottle sidewall haze as demonstrated in Table 2.

TABLE 2

| Example | Bottle Sidewall Haze, % |
|---|---|
| Control | 1.04 |
| 1 (Comp.) | 1.56 |
| 2 (Comp.) | 2.77 |
| 3 | 1.49 |

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A composition comprising a polyester, a copolyester ether, and an oxidation catalyst, wherein the copolyester ether comprises a zinc compound and at least one polyether segment selected from the group consisting of poly(tetramethylene ether) and poly(tetramethylene-co-alkylene ether).

2. The composition of claim 1 wherein said copolyester ether further comprises a polyether segment of a poly(alkylene oxide) glycol selected from the group consisting of poly(ethylene oxide) glycol, poly(trimethylene oxide) glycol, poly(tetramethylene oxide) glycol, poly(pentamethylene oxide) glycol, poly(hexamethylene oxide) glycol, poly(heptamethylene oxide) glycol, poly(octamethylene oxide) glycol and poly(alkylene oxide) glycols derived from cyclic ether monomers.

3. The composition of claim 1 wherein the molecular weight of said polyether segment is in the range of from about 200 g/mole to about 5000 g/mole.

4. The composition of claim 1 wherein said copolyester ether is present in an amount of at least about 0.5% by weight of the total composition.

5. The composition of claim 1 wherein said copolyester ether is present in an amount of from about 0.5% by weight to about 10% by weight of the total composition.

6. The composition of claim 1 wherein said polyether segment is present in an amount of from about 15% by weight to about 95% by weight of said copolyester ether.

7. The composition of claim 1 wherein said oxidation catalyst is at least one member selected from the group consisting of cobalt stearate and cobalt acetate.

8. The composition of claim 1 wherein said oxidation catalyst is present in an amount of at least about 10 ppm of the total composition.

9. The composition of claim 1 wherein said oxidation catalyst is present in an amount of from about 25 ppm to about 500 ppm of the total composition.

10. The composition of claim 1 wherein said zinc compound is selected from the group consisting of zinc oxide, zinc hydroxide, zinc alkoxide, aliphatic acid salt of zinc, zinc acetate, zinc oxalate, zinc citrate, zinc carbonate, zinc halide and a complex compound of zinc.

11. The composition of claim 1 wherein said zinc compound is zinc acetate.

12. The composition of claim 1 wherein said zinc compound is present in an amount of from about 35 ppm to about 100 ppm of the total composition.

13. The composition of claim 1 wherein said zinc compound is present in an amount of from about 40 ppm to about 80 ppm of the total composition.

14. The composition of claim 1 wherein said alkylene of said poly(tetramethylene-co-alkylene ether) is selected from the group consisting of ethylene, propylene and butylene.

15. The composition of claim 14 wherein said alkylene is ethylene.

16. The composition of claim 1 wherein said polyester is at least one member selected from the group consisting of polyethylene terephthalate, polyethylene naphthalate, polyethylene isophthalate, copolymers of polyethylene terephthalate, copolymers of polyethylene naphthalate, copolymers of polyethylene isophthalate, and mixtures thereof.

17. The composition of claim 16 wherein said polyester is a copolymer of polyethylene terephthalate.

18. The composition of claim 1 wherein the oxidation catalyst comprises a transition metal salt comprising i) a metal comprising at least one member selected from the group consisting of cobalt, copper, rhodium, ruthenium, palladium, tungsten, osmium, cadmium, silver, tantalum, hafnium, vanadium, titanium, chromium, nickel, zinc, manganese and mixtures thereof, and ii) a counter ion comprising at least one member selected from the group consisting of carboxylate, oxide, boride, carbonate, chloride, dioxide, hydroxide, nitrate, phosphate, sulfate, silicate and mixtures thereof.

19. The composition of claim 18 wherein said carboxylate is selected from the group consisting of neodecanoate, octanoate, stcarate, acetate, naphthalate, lactate, maleate, acetylacetonate, linoleate, oleate, palminate, and 2-ethyl hexanoate.

20. The composition of claim 1 further comprising an additive.

21. The composition of claim 20 wherein the additive comprises at least one member selected from the group consisting of a heat stabilizer, an anti-blocking agent, an antioxidant, an antistatic agent, a UV absorber, a pigment, a dye, a filler, a branching agent and mixtures thereof.

22. An article of manufacture comprising the composition of claim 1.

23. The article of manufacture of claim 22 wherein the article is selected from the group consisting of film, sheet, tubing, pipe, fiber, container preform, blow molded article, thermoformed article and flexible bag.

24. The article of claim 22 wherein the article comprises one or more layers of the composition.

25. A method of producing an oxygen scavenging resin comprising:
    a) esterifying or transesterifying a polyester precursor with an alkylene glycol and a poly(alkylene oxide) glycol in the presence of a zinc compound to form a copolyester ether, wherein the copolyester ether comprises at least one polyether segment selected from the group consisting of poly(tetramethylene ether) and poly(tetramethylene-co-alkylene ether),
    b) blending the copolyester ether with a polyester and an oxidation catalyst,
    c) melting the blend to form a homogeneous blend, and
    d) cooling and cutting the molten blend into solid pellets.

26. The method of claim 25 wherein the polyester precursor is selected from the group consisting of pure terephthalic acid and dimethyl terephthalate.

27. The method of claim 25 wherein the alkylene glycol is selected from the group consisting of ethylene glycol, propylene glycol and butylene glycol.

28. The method of claim 25 wherein the alkylene glycol is ethylene glycol.

29. The method of claim 25 wherein said zinc compound is selected from the group consisting of zinc oxide, zinc hydroxide, zinc alkoxide, aliphatic acid salt of zinc, zinc acetate, zinc oxalate, zinc citrate, zinc carbonate, zinc halide and a complex compound of zinc.

30. The method of claim 25 wherein said zinc compound is zinc acetate.

31. The method of claim 25 wherein said oxidation catalyst comprises a transition metal salt comprising i) a metal comprising at least one member selected from the group consisting of cobalt, copper, rhodium, ruthenium, palladium, tungsten, osmium, cadmium, silver, tantalum, hafnium, vanadium, titanium, chromium, nickel, zinc, manganese and mixtures thereof, and ii) a counter ion comprising at least one member selected from the group consisting of carboxylate, oxide, boride, carbonate, chloride, dioxide, hydroxide, nitrate, phosphate, sulfate, silicate and mixtures thereof.

32. The method of claim 31 wherein said carboxylate is selected from the group consisting of neodecanoate, octanoate, stearate, acetate, naphthalate, lactate, maleate, acetylacetonate, linoleate, oleate, palminate, and 2-ethyl hexanoate.

33. The method of claim 25 wherein said oxidation catalyst is at least one member selected from the group consisting of cobalt stearate and cobalt acetate.

34. A method for reducing the gas permeability of polyester articles comprising:
    a) esterifying or transesterifying a polyester precursor with an alkylene glycol and a poly(alkylene oxide) glycol in the presence of a zinc compound to form a copolyester ether, wherein the copolyester ether comprises at least one polyether segment selected from the group consisting of poly(tetramethylene ether) and poly(tetramethylene-co-alkylene ether),
    b) blending the copolyester ether with a polyester and an oxidation catalyst to form a mixture,
    c) melting the mixture, and
    d) forming an article comprising the mixture.

35. The method of claim 34 wherein the polyester precursor is selected from the group consisting of pure terephthalic acid and dimethyl terephthalate.

36. The method of claim 34 wherein the alkylene glycol is selected from the group consisting of ethylene glycol, propylene glycol and butylene glycol.

37. The method of claim 34 wherein the alkylene glycol is ethylene glycol.

38. The method of claim 34 wherein said zinc compound is selected from the group consisting of zinc oxide, zinc hydroxide, zinc alkoxide, aliphatic acid salt of zinc, zinc acetate, zinc oxalate, zinc citrate, zinc carbonate, zinc halide and a complex compound of zinc.

39. The method of claim 34 wherein said zinc compound is zinc acetate.

40. The method of claim 34 wherein said oxidation catalyst is at least one member selected from the group consisting of cobalt stearate and cobalt acetate.

41. The method of claim 34 wherein said oxidation catalyst comprises a transition metal salt comprising i) a metal comprising at least one member selected from the group consisting of cobalt, copper, rhodium, ruthenium, palladium, tungsten, osmium, cadmium, silver, tantalum, hafnium, vanadium, titanium, chromium, nickel, zinc, manganese and mixtures thereof, and ii) a counter ion comprising at least one member selected from the group consisting of carboxylate, oxide, boride, carbonate, chloride, dioxide, hydroxide, nitrate, phosphate, sulfate, silicate and mixtures thereof.

42. The method of claim 41 wherein said carboxylate is selected from the group consisting of neodecanoate, octanoate, stearate, acetate, naphthalate, lactate, maleate, acetylacetonate, linoleate, oleate, palminate, and 2-ethyl hexanoate.

* * * * *

UNITED STATES PATENT AND TRADEMARK OFFICE
CERTIFICATE OF CORRECTION

Page 1 of 1

PATENT NO. : 8,647,728 B2
APPLICATION NO. : 13/202466
DATED : February 11, 2014
INVENTOR(S) : Joseph Drbohlav, III It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 275 days.

Signed and Sealed this
Thirteenth Day of October, 2015

Michelle K. Lee
*Director of the United States Patent and Trademark Office*